(12) United States Patent
Contant et al.

(10) Patent No.: US 8,711,045 B2
(45) Date of Patent: Apr. 29, 2014

(54) DOWNHOLE TELEMETRY SYSTEM

(75) Inventors: Matthe Contant, Le Plessis Robinson (FR); Erwann Lemenager, Paris (FR); Yves Mathieu, Les Ulis (FR); Sylvain Chambon, Issy les Moulineaux (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 967 days.

(21) Appl. No.: 12/524,013

(22) PCT Filed: Jan. 21, 2008

(86) PCT No.: PCT/EP2008/000612
§ 371 (c)(1),
(2), (4) Date: Jan. 26, 2010

(87) PCT Pub. No.: WO2008/090006
PCT Pub. Date: Jul. 31, 2008

(65) Prior Publication Data
US 2010/0149056 A1 Jun. 17, 2010

(30) Foreign Application Priority Data
Jan. 26, 2007 (EP) .................................. 07290116

(51) Int. Cl.
*H01Q 1/04* (2006.01)
(52) U.S. Cl.
USPC .................... 343/719; 340/852; 340/853.1
(58) Field of Classification Search
USPC ................... 343/719; 340/850, 852, 853.1
See application file for complete search history.

(56) References Cited

U.S. PATENT DOCUMENTS

| | | | | |
|---|---|---|---|---|
| 3,967,201 A | * | 6/1976 | Rorden | 340/854.5 |
| 4,207,568 A | * | 6/1980 | MacLeod | 340/852 |
| 4,766,442 A | * | 8/1988 | Issenmann | 343/719 |
| 4,949,045 A | * | 8/1990 | Clark et al. | 324/338 |
| 5,189,415 A | * | 2/1993 | Shimada et al. | 340/854.6 |
| 5,394,141 A | * | 2/1995 | Soulier | 340/854.4 |
| 5,530,358 A | * | 6/1996 | Wisler et al. | 324/338 |
| 5,576,703 A | * | 11/1996 | MacLeod et al. | 340/854.4 |
| 6,100,696 A | * | 8/2000 | Sinclair | 324/339 |
| 6,188,223 B1 | | 2/2001 | Van Steenwyk | |
| 6,255,817 B1 | * | 7/2001 | Poitzsch et al. | 324/303 |
| 6,788,253 B1 | * | 9/2004 | Calin | 342/464 |
| 6,788,263 B2 | * | 9/2004 | Clark et al. | 343/719 |
| 6,926,098 B2 | | 8/2005 | Peter | |
| 7,252,160 B2 | * | 8/2007 | Dopf et al. | 175/40 |
| 7,348,781 B2 | * | 3/2008 | Tabanou et al. | 324/333 |

(Continued)

FOREIGN PATENT DOCUMENTS

| | | |
|---|---|---|
| DE | 69907597 | 3/2004 |
| GB | 2259832 | 3/1993 |
| GB | 2404401 | 2/2005 |
| WO | 9429749 | 12/1994 |

*Primary Examiner* — Jason M Crawford
(74) *Attorney, Agent, or Firm* — Cameron R. Sneddon (57) ABSTRACT

An EM antenna for location on a pipe (10) surrounded by a casing (12). The antenna has a power source (21) for injecting a current across a first insulated section (25) of the pipe (10) and an electrode (22) for conducting the current from the pipe (10) to the casing (12). There is also a second insulated section (23) of the pipe arranged to operate together with the electrode (22) and first insulated section (25) for directing a path flow of the current. Such antennas are described both in relation to repeater arrangements as well as land and sea applications.

39 Claims, 5 Drawing Sheets

(56) References Cited

U.S. PATENT DOCUMENTS

| | | | |
|---|---|---|---|
| 7,436,183 B2* | 10/2008 | Clark | 324/338 |
| 7,495,446 B2* | 2/2009 | Lovell et al. | 324/338 |
| 2002/0079899 A1* | 6/2002 | Frey et al. | 324/338 |
| 2002/0171560 A1* | 11/2002 | Ciglenec et al. | 340/853.1 |
| 2003/0025639 A1* | 2/2003 | Rodney et al. | 343/719 |
| 2003/0098157 A1 | 5/2003 | Hales et al. | |
| 2003/0102980 A1 | 6/2003 | Koro | |
| 2003/1029800 | 6/2003 | Koro | |
| 2008/0166917 A1* | 7/2008 | Hall et al. | 439/583 |

* cited by examiner

DOWNHOLE TELEMETRY SYSTEM

FIELD

The present invention relates to wireless telemetry and in particular, but not specifically, to an apparatus and method for transferring information between a downhole device and a surface device.

BACKGROUND

Oil and gas wells are expensive to construct and it is advantageous to operate these wells as efficiently as possible. One way of providing for an increased efficiency in the operation of wells is that equipment located downhole in the well bore is placed under the control of other equipment located on the surface.

The downhole equipment can be measurement sensors which supply useful information for the subsequent operation of the well, which for example might include: data regarding pressure, the nature of the solids and fluids encountered, the temperature, etc. The equipment can also be other controllable or monitoring equipment which is able to supply important instructions from the surface to control various parameters of the well or the reservoir using downhole equipment or devices such as valves, packers, etc.

Electromagnetic (EM) wireless telemetry is a field that is extremely valuable and widely studied in the oilfield. The purpose is to provide wireless bi-directional telemetry, for transferring information from the surface to tools downhole in the well and vice-versa, i.e. to the surface.

Whereas downhole tools might have wireless components in performing their various sensing functions downhole, they often require wired connections to get the sensed information communicated from deep below up to the earth's surface for analysis. Alternatively, the sensed information is stored in memory and only retrieved once the piping structure and associated tools are pulled out of the well. Supplying power at these depth for any wireless communication device does boost the range of such a wireless communication device or antenna, but it requires a remote battery source from which a great deal of power is required downhole. Thus, such wireless communication devices often have a limited range of communications and therefore wired solutions have often proved more practical, especially at great depth. During drilling or drill stem testing operations, the use of a wire is often unpractical and in some cases banned by operators.

Therefore, it is desirable to have a bi-directional telemetry system having a greater EM communication range, which reduces the need for wired communications.

Furthermore, a plurality of different technologies have been tried to produce an optimized bi-directional wireless telemetry system, including for example acoustic through tubing techniques, pressure wave in fluid, etc. However, these other techniques do not appear to offer the range of communication and simplicity that EM brings. Moreover, a distinction needs to be made between so-called 'open-hole' and 'cased-hole' hole environments, especially where an EM telemetry system is considered.

A conventional open-hole method for measuring a signal downhole is to inject current onto the drill pipe or tubing. Although this method is well-suited to the open-hole system, it is not considered appropriate for a cased-hole situation.

Specifically, a cased-hole system has a casing that lines the walls of the borehole for, amongst other things, maintaining the structural integrity of the drilled borehole. However, the casing is often made from a metal, for example steel, which is highly electrically conductive and thus increases the likelihood of axial leakage of current injected on the drill pipe, resulting in a shorter electromagnetic (EM) dipole length for the antenna. Such leakage can occur either where there is a conductive liquid or substance, for example water, which fills the annular space (or gap) between the drill pipe and casing or in the case of a deviated well, in which the drill pipe and casing come into contact.

In the case of a deviated well, when the drill pipe or casing is sufficiently curved or deviated accumulatively, it is possible that that drill pipe makes contact with the casing, and then the leakage is exacerbated. That is, the injected current will have an extremely short current path with most current simply returning to the current source along the contact area between drill pipe and casing. This 'short-circuit' effectively limits any meaningful range for EM communications in a cased hole system.

Therefore it is desirable to overcome the aforementioned disadvantages associated with open-hole injected current antennas when applied to a cased hole environment.

SUMMARY

According to one aspect of the present invention there is provided an antenna for location on a pipe surrounded by a casing, the antenna comprising: a power source for injecting a current across a first insulated section of the pipe; an electrode for conducting the current from the pipe to the casing; and a second insulated section of the pipe arranged to operate together with the electrode and first insulated section for directing a path flow of the current.

According to another aspect of the present invention there is provided an antenna configured for operating on a drill pipe that is separated from a surrounding formation by a casing, the antenna comprising: a power source for injecting a current across a first insulated section of the drill pipe; an electrode for conducting the current from the drill pipe to the casing and formation; and a second insulated section of the drill pipe, arranged to operate together with the electrode and first insulated section, for shaping a path flow for the current.

According to another aspect of the present invention there is provided a method of lengthening an electromagnetic dipole on a downhole antenna, the downhole antenna is located on a pipe having an annular spacing from a casing that lines a formation, the method comprising: injecting current across a first insulated section of the drill string; conducting the current through an electrode from the pipe to the casing; and directing a path for the current to flow using a second insulated section configured to operate together with the first insulated section and the electrode for lengthening the electromagnetic dipole.

According to yet another aspect of the present invention there is provided an antenna for location downhole on a pipe surrounded by a casing, the antenna comprising: a power source for injecting a current across a first insulated section of the pipe, the first insulated section providing an electrical discontinuity in the pipe; a first electrode for conducting the current from a first location of the pipe to the casing; a second electrode for conducting the current from the casing to a second location of the pipe; and a second insulated section insulating a selected length of the pipe which covering the power source and first insulated section Advantageously, wherein the second insulated section of the pipe operates together with the first and second electrodes and the first insulated section for directing a path flow of the current from the pipe through the first electrode to the casing and returning through the second electrode to the pipe.

Advantageously, wherein the second insulator is oriented substantially perpendicularly to the first insulator.

Advantageously, wherein the power source and first and second insulators are located on the pipe aligned between the first and second electrodes. Alternatively, wherein the power source and first and second insulators are located on the pipe aligned adjacent at least one of the first and second electrodes.

According to yet another aspect of the present invention there is provided an antenna for location downhole on a pipe surrounded by a casing, the pipe having a plurality of segments joined at respective stand-off points, the antenna comprising: a power source for injecting a current across a first insulated section of the pipe, the first insulated section providing an electrical discontinuity in the pipe; a first electrode for conducting the current from a first location of the pipe to the casing; a second electrode for conducting the current from the casing to a second location of the pipe; a second insulated section insulating a selected length of the pipe which covering the power source and first insulated section; and a set of further discrete insulated sections insulating the respective stand-off points.

Advantageously, wherein the insulation sections operate together with the electrodes for directing a path flow of the current.

Advantageously, wherein the path flow is from the pipe through the first electrode to the casing to the second electrode which conducts the current back to the pipe forming an appropriate current loop.

Advantageously, wherein the path flow additionally encompasses a portion of the formation such that the current path flows from the casing through the portion of the formation back to the casing at the second electrode, which conducts the current back to the pipe.

According to yet another aspect of the invention there is provided an antenna for location downhole on a pipe surrounded by a casing, the pipe having a plurality of segments joined at respective stand-off points, the antenna comprising: a power source for injecting a current across a first insulated section of the pipe, the first insulated section providing an electrical discontinuity in the pipe; a first electrode for conducting the current from a first location of the pipe to the casing; a second electrode for conducting the current from the casing to a second location of the pipe; a second insulated section insulating the pipe between the first and second electrodes.

According to yet another aspect of the invention there is provided an antenna for location downhole on a pipe surrounded by a casing, wherein a conductive material is present the pipe having a plurality of segments joined at respective stand-off points, the antenna comprising: a power source for injecting a current across a first insulated section of the pipe, the first insulated section providing an electrical discontinuity in the pipe; a first electrode for conducting the current from a first location of the pipe to the casing; a second insulated section insulating a selected length of the pipe, covering the power source and first insulated section, and extending a substantial length along the pipe in a direction opposite the first electrode.

Advantageously, wherein an annular space separates the pipe from the casing and wherein said annular gap is filled with an electrically conductive material.

Advantageously, wherein the substantial length being a length which maximizes an electrical dipole of the antenna in providing a return path for current to flow from the casing back to the pipe at an appropriate location.

Advantageously, wherein the second insulation section operates together with the first insulation section and electrode to shape a path flow of current which is directed from the pipe through the first electrode to the casing through the conductive material back to the pipe at a location substantially where the second insulation is terminated.

According to yet another aspect of the invention there is provided a wireless telemetry system for transferring communication signals from a location on a pipe downhole to a transceiver located on the surface using at least one of the antenna embodiments of the present invention.

Advantageously, the surface is the surface of the earth's crust. Alternatively it is a location on the surface of the sea. Alternatively, it is the surface of the seabed.

According to yet another aspect of the invention there is provided an antenna for location on a pipe surrounded by a casing, the antenna comprising: a power source located across a first insulated section of the pipe for injecting a current at a substantially first location of the pipe; an electrode and a second insulator for conducting the current from a second location on the pipe to the casing; and wherein the second insulated section also operates together with the electrode and casing for directing a path flow of the current along the casing and conducted back to a third location on the pipe.

Advantageously, the second and third locations of the pipe are on opposite sides of the first location where the first insulated section is located on the pipe.

LIST OF DRAWINGS

Embodiments of the present invention will now be described by way of an example with reference to the accompanying drawings, in which.

DESCRIPTION

Figure 1:
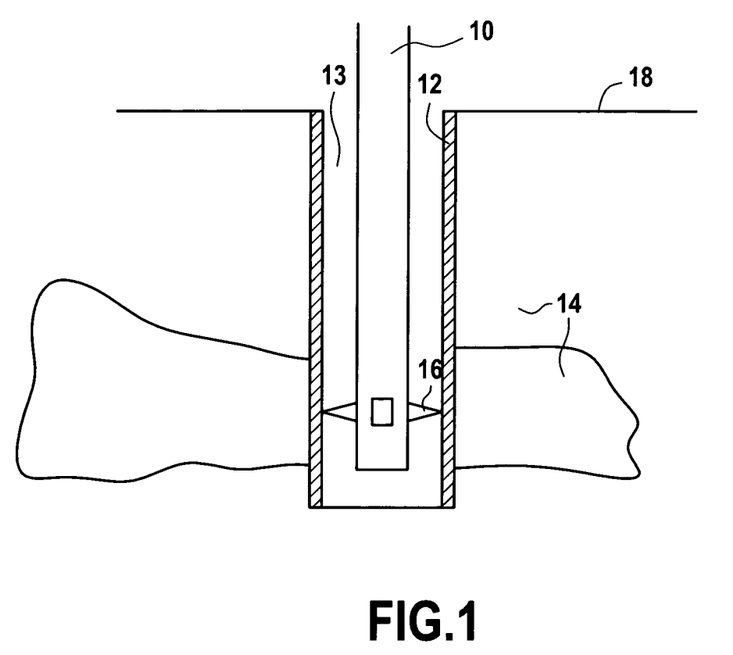
FIG. 1 shows an example of a drill pipe extending downhole for reservoir characterization and measurement.

FIG. 1 shows a drill pipe extending downhole for reservoir characterization and measurement. That is, a hole 13 has been drilled into the earths crust and the walls of the surrounding formation 14 have been lined with a casing 12. The casing 12 constituted of metal or other material, that is potentially more electrically conductive than the surrounding formation 14.

The surrounding formation 14 is comprised of different layers of rock, sand and clay that may contain various fluids, i.e. liquids or gasses. In the specific case of an oil well, the tools may be located on the drill pipe 10 that extends downhole, at the desired depth for taking measurements to get a better picture of exactly where the hydrocarbons reside. It should be appreciated however that embodiments of the invention are not necessarily limited to the hydrocarbon application.

Rather, embodiments of the inventions are concerned with providing a bi-directional telemetry system for wireless communication between the surface 18 and a downhole antenna 16 shown as being located at the foot of the drill pipe 10. Specifically a downhole antenna, acting as a current source, is placed downhole along with other downhole tools, for example: packer, valves, samplers, gauges, etc.

Figure 2:
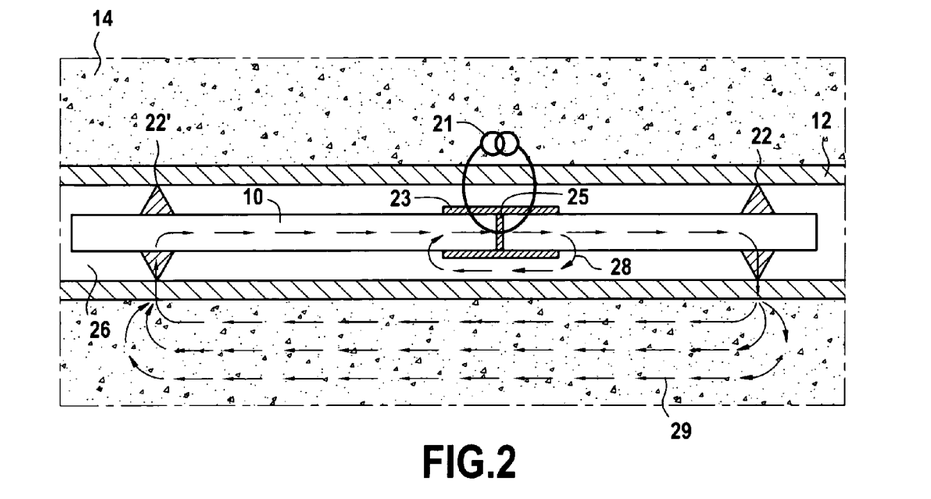
FIG. 2 shows a first embodiment of the downhole antenna.

FIG. 2 shows a first embodiment of the downhole antenna. This embodiment is shown to comprise a current source 21 and insulation sections 23, 25 which are located substantially centrally between two electrodes 22, 22', each electrode extending from the drill pipe 10 to make contact with the casing 12.

The current is shown in the embodiments to be injected by a current source 21, however it should be appreciated that the actual injected current can be created by any type of power source, that is able to generate a current. For example a voltage source with a variable resistance is series is also able to inject the desired level of current. Indeed, a sensor transducer, for example measuring temperature could be made to vary such a resistance and hence purposefully affect the current injected and indeed the data which is communicated by the antenna to the surface.

In any event, the current source injects current across a first insulator 25, which is orientated axially in respect to the longitudinal orientation of the drill pipe 10. This first insulator prevents current from short-circuiting and forces current along the drill pipe 10 in the direction of one of the electrodes 22. Thus, the first insulator provides a discontinuity in the electrical conductivity of the drill pipe forcing current to flow in a desired direction.

A second pair of insulators 23 extend along the longitudinal edges of the drill pipe 10. These insulators 23 prevent radiation leakage in the gap (or annular spacing) 26 between the drill pipe 10 and casing 12. The potential conductivity of the gap 26 can increase if the borehole is filled with electrically conductive materials, for example water, water-based mud or brine. Thus, at least one function of the second insulators 23 is to prevent the radial leakage of the injected current close to the current source 21, especially if the gap 26 is filled with a conductive liquid.

The first and second insulator sections 23, 25 therefore combine to direct a great proportion of the current flow along the drill pipe 10 to at least one of the electrodes 22, 22', which then conducts the current to the casing 12 and formation 14, setting up current paths 29, which return to the drill pipe 10 via the second electrode 22, in order to complete the current path at the current source 21. Thus, the downhole antenna injecting current across an axially insulated section 25. The current travels through the drill pipe to one of the electrode 22. Some current returns through the casing to the other electrode 22', but a portion travels upwards along the casing walls and a portion travels radially through the formation.

It is the combination of the first insulator section 25, the second insulator section 23 and the electrodes 22, which are able to shape or direct a path of current to prevent leakage in an unwanted direction. As already described, conventional EM downhole antennas have a limitation on their range or EM propagation. Embodiments of the invention increase this range and efficiency of the antenna by increasing the so-called dipole moment of the downhole antenna.

The efficiency of the signal transmission and reception depends on the dipole moment of the antenna, which is the product of the injected current by the dipole length. The higher the dipole moment, the larger the electromagnetic signal. Thus, at least one objective of an embodiment is to maximize the electrical dipole moment to extend the telemetry range. The most effective way to increase the dipole moment is to increase the dipole length rather than the injected current, since the required downhole power is proportional to the square of the injected current with its own size and power limitations.

Figure 4:
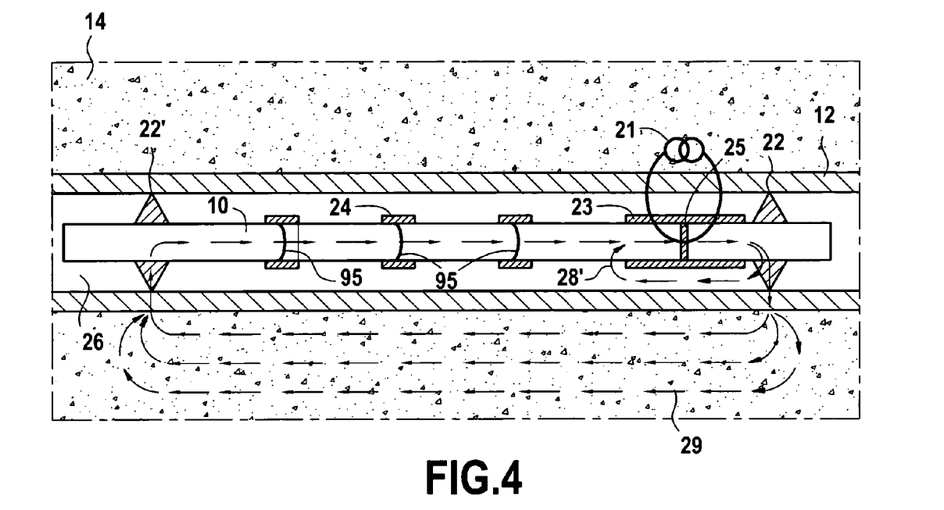
FIG. 4 shows an embodiment with further stand-off insulation.

As shown in the embodiments for example that of FIG. 4, a portion of the current injected on the drilled pipe 10 does not reach the electrodes 22 and leaks radially in the annular space 26 between the drill pipe 10 and the casing 12, as indicated by the leakage current path 28. The greater the leakage current, the smaller the electrical dipole moment and hence the effective dipole length is reduced. This phenomenon is exacerbated in the case of contact between the pipe tubing 10 and casing 12.

Thus, it is desirable to maintain the effective dipole length as long as possible, which is accomplished by the first and second insulation sections and the electrodes operating together to direct a current path, so as to maximize the effective EM dipole length of the antenna.

Figure 3:
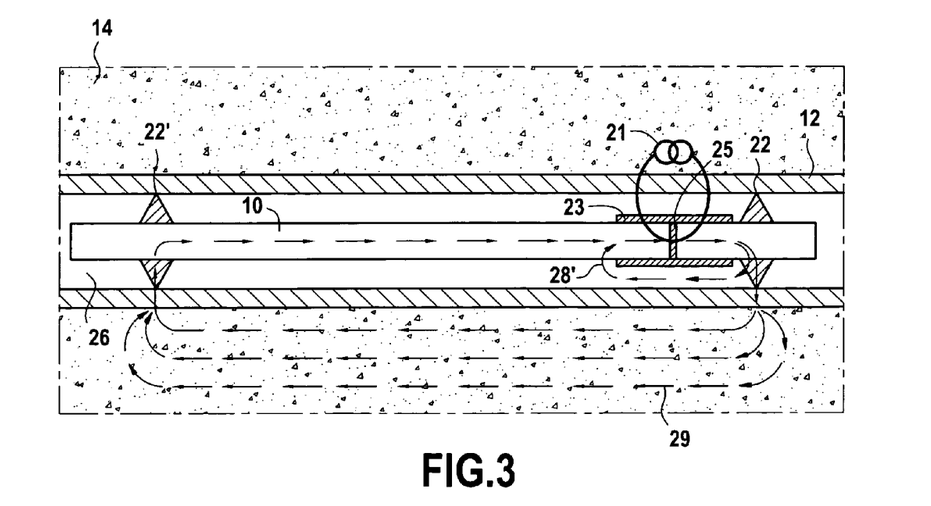
FIG. 3 shows an embodiment of an off-centered antenna configuration.

FIG. 3 shows an embodiment of an off-centered antenna configuration, in which the current source 21 with its insulated sections 23, 25 are substantially aligned against one of the electrodes 22. Again though there is likely to be a leakage path 28. An advantage of the off-centered embodiment of FIG. 3 is that by shifting the power source closer to the one electrode, it is possible to simplify the cabling and mechanical integration of the system. For example, the antenna can be physically implemented within an electrode.

FIG. 4 shows an embodiment, which is able to compensate for a bendy or imperfectly straight casing 12 and/or drill pipe 10. In such a case the gap 26 is reduced, reducing the impedance of the gap, and even in the case of direct contact resulting in massive radial leakage, limiting the EM dipole length unnecessarily. In order to overcome these disadvantages, a first option is shown in the embodiment of FIG. 4, which consists of introducing further insulated stand-off sections 24 along the pipe tubing 10. The effect of such insulated-stand-off points is to avoid contact points between the pipe tubing 10 and the casing 12.

Figure 9:
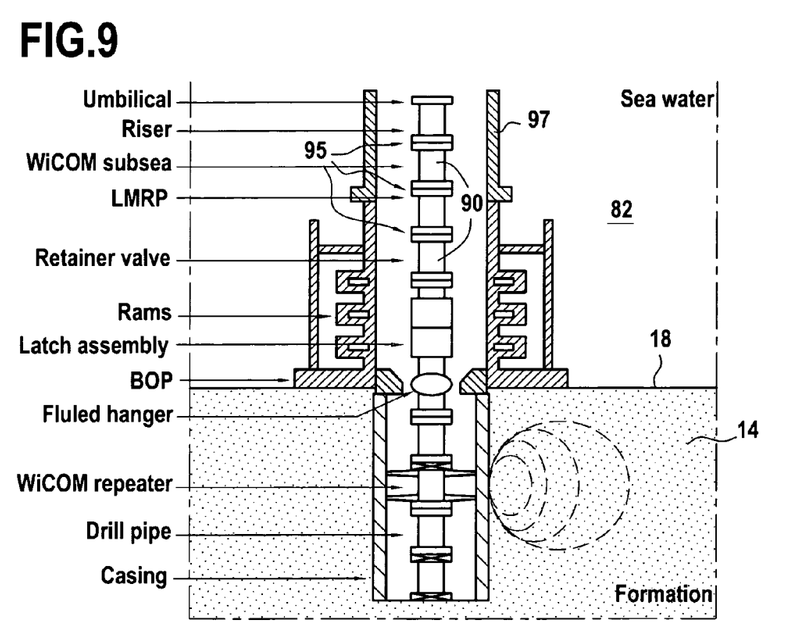
FIG. 9 shows a subsea application with wireless antenna only communicating below the earths surface with a cable communicating through the subsea wellhead.

Practically, the drill pipe 10 is often made-up by joining together a plurality of drill pipe segments. FIG. 9 for example shows these drill pipe segments meeting at segment joins 95. Thus, insulated stand-offs applied to such section joins 95 will not only protect the pipe from contact at it most outstanding points, but also potentially improves the join itself.

A further advantage of such an embodiment as shown in FIG. 4 is that an improved EM dipole can be achieved by using a minimum of insulation material to achieve such separation. That is, the further insulation 24 is applied only to the segment joins 95 as opposed to having to cover the entire length of the drill pipe 10 between the electrodes 22 and 22'.

Figure 5:
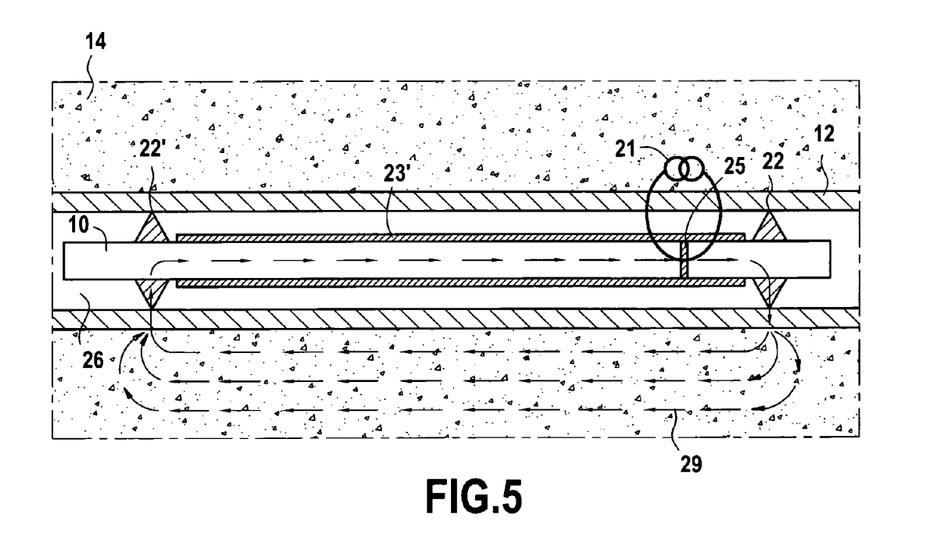
FIG. 5 shows an embodiment with asymmetrically located current source and extended insulation.

FIG. 5 shows another embodiment of the invention in which the current source is not only asymmetrically located (i.e. aligned closer to one of the electrodes 22 like FIG. 3), but additionally the second insulated sections 23' are both extended to cover the entire length of the drill pipe 10 between the two electrodes 22 and 22'. The latter feature is different from the FIG. 3 embodiment, where the second insulative section 23 only insulated a small portion of the length of the drill pipe 10 between the two electrodes.

FIG. 5 shows an option in which the entire length of the pipe between electrodes is electrically insulated, which prevents any radial leakage to the casing 12 and hence maximizes the effective length of the dipole, but does require the whole length of the drill pipe 10 between the two electrodes to be covered.

Figure 6:
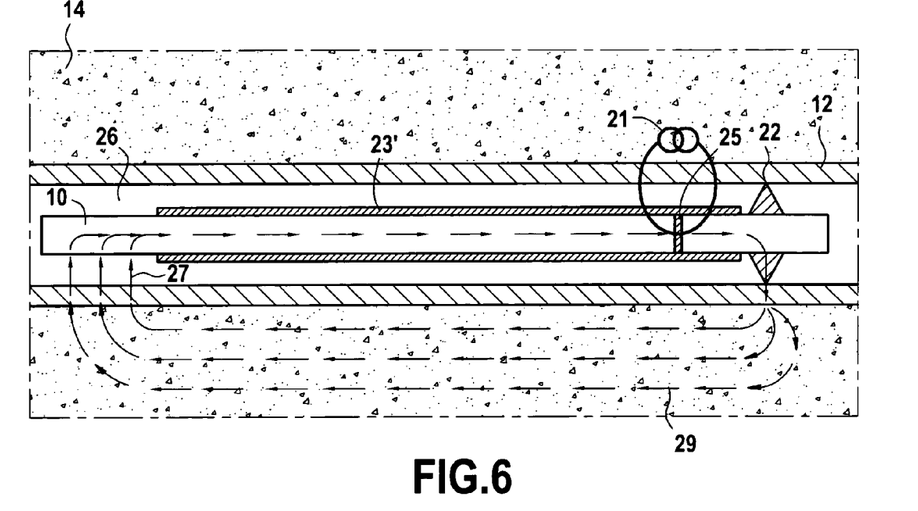
FIG. 6 shows an embodiment with one electrode and extended insulation.

FIG. 6 shows a further embodiment in which the second electrode 22' has been removed as compared to that of the FIG. 5 embodiment. Due to the longer length of the second insulation section 23', the current path will automatically return from the casing and formation 12, 14 to the drill pipe 10 at the point 27 where the second insulation 23' stops. The reason is that at the point 27' the dielectric strength is weakest between the drill pipe 10 and casing 12, because there is no longer the insulation material 23'. Thus, the embodiment of Figure shows the possibility of maintaining a large EM dipole using only one electrode, but by lengthening the second insulation section 23'. Thus, it is the combination of the first insulation section 25, at least one electrode 22 and a second insulation section 23' which shapes the current path and achieves the advantageous effect of a longer EM dipole length.

It should be appreciated that an advantage of the embodiments of the invention is that the EM dipole is shaped by a current path which uses both the drill pipe and casing to conduct current. Thus, a substantially long EM dipole is created without the need for complex power sources or longer cables needed for applying signals across a conductor to establish a current to flow. Instead, the embodiments of the invention are able to shape a current path flow over a substantial length of both the casing and the drill pipe itself. That is, the various combinations of insulation and electrode placement ensure a relatively long current path is established in the drill pipe without the need for long electrical cables, and as such the effective EM dipole length is optimized.

Figure 7:
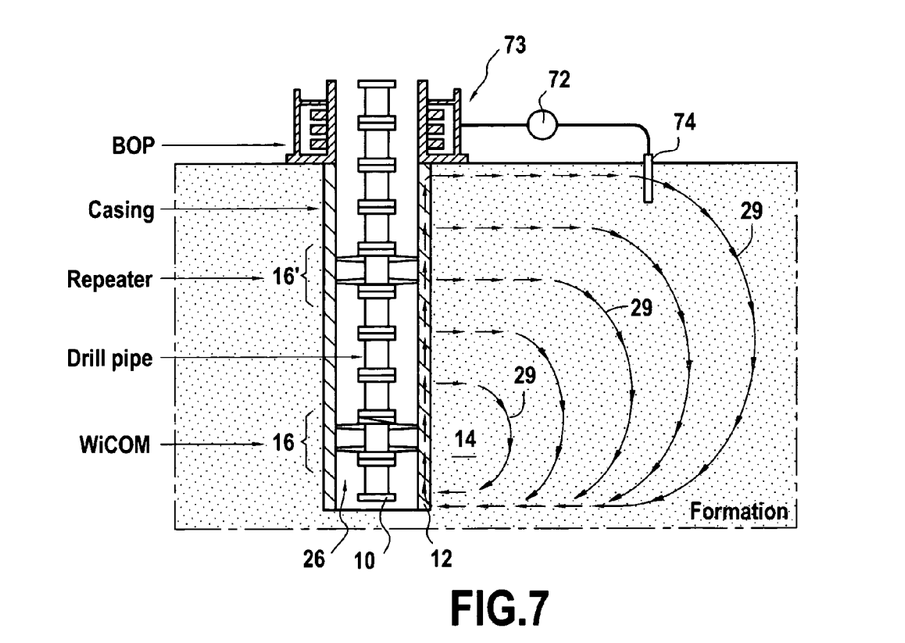
FIG. 7 shows a land application with antennas operating as repeaters for communicating between the surface and downhole.

FIG. 7 shows a first application of a telemetry using an antenna according to one of the embodiments, for a normal land well.

A current I injected by the antenna 16 generates an extremely low frequency electromagnetic signal that travels along the piping structure (casing and drill pipe) and returns through the formation. Indeed, it is shown that each antenna causes a plurality of current paths 29 to be setup through the casing and surrounding formation. The generated electromagnetic signal is measured by a distant antenna in the well bore, also known as repeater 16'. The repeater interprets the measured signal and retransmits the signal received. The signal travels from repeater to repeater to reach the surface or the seabed where it is picked up and interpreted.

More specifically, each repeater is able to be configured with processing circuitry for filtering, processing, decoding and/or storing data transferred from another repeating antenna. Thus, it should be appreciated that the processing circuitry of each antenna is able to be configured with known signal processing techniques for processing and manipulating the data signal, which for example, further include any compression/decompression data transmission algorithms.

In a further embodiment, a repeater system could for example comprise a chain of antennas according to any of the embodiments described herein, or could comprise a system whereby the final antenna in the repeater system employs a different method of communication with the surface transceiver. For example, rather than EM communication, the final antenna of a series of repeaters could communicate with the surface transceiver via an acoustic method or a physical cable (see FIG. 9), which might be more advantageous in certain applications.

FIG. 7 is specifically concerned with a normal land well, in which the electromagnetic signal is measured at surface between the rig structure 73 and a distant point 74, a few tens of meters away from the rig structure. This signal detection consists of measuring the potential difference between the rig structure 73 and the distant point 74, which is induced by the current paths traveling in the subsurface formation. Alternatively the signal detection can be made with the use of magnetometers.

In the case of subsea wells, it is difficult from a deployment standpoint to measure the potential difference between the subsea wellhead and a distant point on the seafloor, especially in the case of deep and ultra deep offshore wells. In such a subsea environment, the described antenna embodiments are used to detect and decode the electromagnetic signal at the seafloor 18, either above the subsea well head as depicted in FIG. 8 or below the subsea well head as depicted in FIG. 9.

Figure 8:
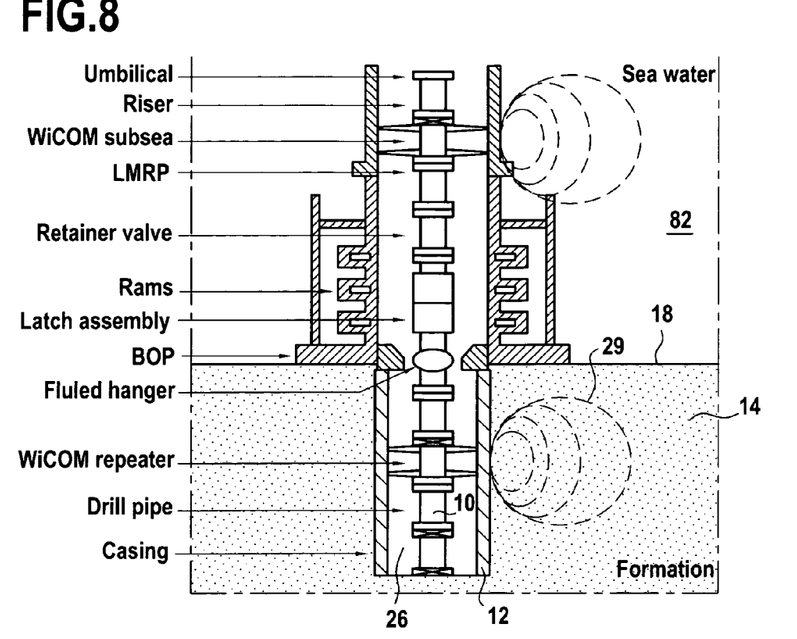
FIG. 8 shows a subsea application with wireless antennas for communicating all the way from downhole to the sea surface.

Specifically, FIG. 8 shows an embodiment in which both the detection and decoding can be performed by wireless telemetry EM antennas both under the sea water level and under the seabed 18, whereas FIG. 9 shows the detection and decoding being only performed by wireless EM antennas beneath the seabed 18 and the signal once decoded, is simply conveyed to the surface by mean of a cable 90. Specifically, the cable 90 is shown in the embodiment of FIG. 9 to be located within the riser 97 and casing of the well. It should also be appreciated that such a cable could be placed outside the riser.

An advantage of the FIG. 8 embodiment, in which the repeating antenna(s) are located above the subsea wellhead, is easy deployment in that no cabling is necessarily through the wellhead, which is typically sealed once installed in the seabed. However, the EM nature of the antenna transceivers, both above and below the subsea wellhead, do not require any modifications to the wellhead in order to effect communications between a downhole location and the surface.

An advantage of the FIG. 9 embodiment, in which the final repeating antenna is located below the subsea wellhead, is that although it requires more effort in passing a physical cable through the well head, there is less attenuation of the signal through the wellhead to the surface.

Thus, a two-way wireless telemetry system is used in a well bore to communicate between downhole and surface. In some embodiments, the principle is to use two electrodes in contact with the casing in conjunction with an axially insulated joint, acting as electrical dipole or electromagnetic (EM) antenna for transmitting or receiving the wireless signal. Several antennas could be placed at different locations along the well bore, each of them playing the role of a transceiver. The range of the wireless telemetry is extended by the use of additional repeaters. The signal is ultimately picked up and interpreted either at surface or on the seabed. Reciprocally the EM signal travels from the surface or seabed down to the downhole tool via the repeaters.

To send information from surface to down hole, a current is injected between the wellhead and a point on the ground a certain distance away from the wellhead. The current is modulated to convey a signal from surface to downhole. The current travels along the piping structure, casing and pipe, and returns through the formation. To receive this information from surface, the downhole tool measures a voltage difference on the casing. This signal is being amplified in the tool, decoded and the tool takes action based on the signal received. To send information from downhole to surface, the tool injects a current into the piping structure, casing and pipe. This current needs to be injected between two points on the casing. Specific coding of this current signal carries the information from down hole to the surface. At the surface the current is measured as a voltage difference between the wellhead and a second point on the ground.

It should be appreciated that while the embodiments of the invention apply to wells for hydrocarbons such as oil and gas, there is a range of other potential applications for such a wireless telemetry system surrounded by a cased or conductive piping, for example, deep earth exploration, water prospecting, or even drilling beneath ice caps to communicate and controlling instruments/robots at great depth beneath the surface.

It should also be appreciated that the embodiments are non-limiting and it would be understood by a skilled person that a mixture of such embodiments may occur, where for example further insulation may not only cover the pipe segment joins, but also selected lengths of the intervening drill pipe segments themselves depending on the requirements.

It should also be appreciated that the riser 97 is a technical term describing in effect an extension of the casing 12 above the subsea wellhead. Thus, in at least one embodiment, the riser 97 and casing 12 are in effect part of the same electrically conductive pipe, which surrounds the inner drill pipe 10. Other common terms to describe the drill pipe 10 are the drill tubing or drill string.

It should also be appreciated that the wireless telemetry system comprising an antenna according to any of the described embodiments is able to communicate data pertaining to a plurality of different applications. For example, the antenna is capable of communicating data of downhole pressure, temperature, resistivity, porosity, flow rates, etc to the surface. Alternatively, it is possible to control from the surface the operation of downhole equipment such as samplers, valves, packers, perforating charges, etc. This is a non-exhaustive list of some of the uses that may be application, although it should be appreciated that any remote application is intended.

The invention claimed is:

1. An antenna located on a pipe surrounded by a casing, the antenna comprising:
    a power source to inject a current across a first insulated section of the pipe;
    an electrode to conduct the current from the pipe to the casing; and
    a second insulated section of the pipe to operate with the electrode and first insulated section to direct a flow path of the current, wherein the second insulated section is to substantially prevent leakage of the current into a gap between the pipe and the casing;
wherein the antenna is to communicate wirelessly with a similar antenna located on the pipe.

2. The antenna of claim 1, wherein the pipe and the casing are electrically conductive.

3. The antenna of claim 1, wherein a face of the casing abuts with an electrically conductive substance.

4. The antenna of claim 3, wherein the substance includes materials that make up the Earth's crust.

5. The antenna of claim 3, wherein the substance is seawater.

6. The antenna of claim 1, wherein the pipe is a drill tubing.

7. The antenna of claim 1, wherein the pipe is separated by an annular spacing from the casing.

8. The antenna of claim 1, wherein the power source is a current source.

9. The antenna of claim 1, wherein the power source is a voltage source.

10. The antenna of claim 1, wherein the flow path forms a current loop through the pipe, the electrode and the casing.

11. The antenna of claim 10, wherein the current loop further includes a section of formation lined by the casing.

12. The antenna of claim 1, wherein the flow path of the current generates an electromagnetic signal.

13. The antenna of claim 12, wherein the electromagnetic signal is to communicate data wirelessly.

14. The antenna of claim 12, wherein the electromagnetic signal is of an extremely low frequency.

15. The antenna of claim 1, wherein the antenna is to communicate with a plurality of antennas located along the pipe to wirelessly transfer a signal from a first end of the pipe to a second end of the pipe.

16. The antenna of claim 15, wherein the first end of the pipe is located downhole at a bottom of a borehole, and the second end of the pipe is located at a surface of the earth.

17. The antenna of claim 15, wherein antennas are located on the pipe at sections below a well head location of the pipe.

18. The antenna of claim 17, wherein one of the antennas that is located on the pipe below, yet closest to, the well head is to communicate with a surface transceiver without electromagnetic communications.

19. The antenna of claim 17, wherein one of the antennas that is located on the pipe above, yet closest to, the well head is to communicate with a surface transceiver without electromagnetic communications.

20. The antenna of claim 19, wherein one of the antennas that is located on the pipe below, yet closest to, the well head is to communicate with a surface transceiver using a physical cable.

21. The antenna of claim 1, wherein the antennas are located on the pipe at sections above and below a well head location of the pipe.

22. The antenna of claim 1, wherein the first insulated section provides a discontinuity in an electrical conductivity of the pipe.

23. The antenna of claim 1, wherein the first insulated section is orientated in an axial direction with respect to a longitudinal orientation of the pipe.

24. The antenna of claim 1, wherein the second insulated section is orientated substantially perpendicular to the first insulated section.

25. The antenna of claim 1, wherein the power source is located substantially adjacent to the electrode.

26. The antenna of claim 1, further comprising a second electrode to conduct the current from the casing to the pipe.

27. The antenna of claim 1, wherein the second insulated section covers a portion of a length of the pipe.

28. The antenna of claim 27, wherein the second insulated section covers the power source and the first insulated section.

29. The antenna of claim 27, wherein the second insulated section covers an entire length of the pipe between the first and second electrodes.

30. The antenna of claim 27, further comprising a plurality of discrete insulated stand-offs to insulate section joins of the pipe.

31. An antenna to be disposed downhole on a pipe surrounded by a casing, the antenna comprising:
    a power source to inject a current across a first insulated section of the pipe, the first insulated section providing an electrical discontinuity in the pipe;
    a first electrode to conduct the current from a first location of the pipe to the casing;
    a second electrode to conduct the current from the casing to a second location of the pipe; and
    a second insulated section insulating a portion of a length of the pipe, the second insulated section including an insulator between the pipe and the casing to direct the current along the pipe;

wherein the antenna is to communicate wirelessly with a similar antenna located on the pipe.

32. The antenna of claim 31, wherein the second insulated section of the pipe operates with the first and second electrodes and the first insulated section to direct a flow path of the current from the pipe through the first electrode to the casing and returning through the second electrode to the pipe.

33. The antenna of claim 31, wherein the second insulated section is oriented substantially perpendicularly to the first insulated section.

34. The antenna of claim 31, wherein the power source and the first and second insulating sections are located on the pipe centrally between the first and second electrodes.

35. The antenna of claim 31, wherein the power source and the first and second insulators are located on the pipe adjacent at least one of the first or second electrodes.

36. An antenna to be disposed downhole on a pipe surrounded by a casing, the pipe having a plurality of segments joined at respective stand-off points, the antenna comprising:
a power source to inject a current across a first insulated section of the pipe, the first insulated section providing an electrical discontinuity in the pipe;
a first electrode to conduct the current from a first location of the pipe to the casing;
a second electrode to conduct the current from the casing to a second location of the pipe;
a second insulated section insulating a portion of a length of the pipe between the power source and the first insulated section; and
a set of discrete insulated sections insulating the respective stand-off points to insulate the pipe from the casing;
wherein the antenna is to communicate wirelessly with a similar antenna located on the pipe.

37. The antenna of claim 36, wherein the first and second insulated sections are to operate with the first and second electrodes to direct a flow path of the current.

38. The antenna of claim 37, wherein the flow path is from the pipe through the first electrode to the casing to the second electrode which is to conduct the current back to the pipe to form a current loop.

39. The antenna of claim 38, wherein the flow path includes a portion of the formation such that the current path flows from the casing through the portion of the formation back to the casing at the second electrode, which conducts the current back to the pipe.

* * * * *